H. D. MURDOCK.
CONTROL SYSTEM.
APPLICATION FILED MAY 23, 1919.
1,437,068.
Patented Nov. 28, 1922.
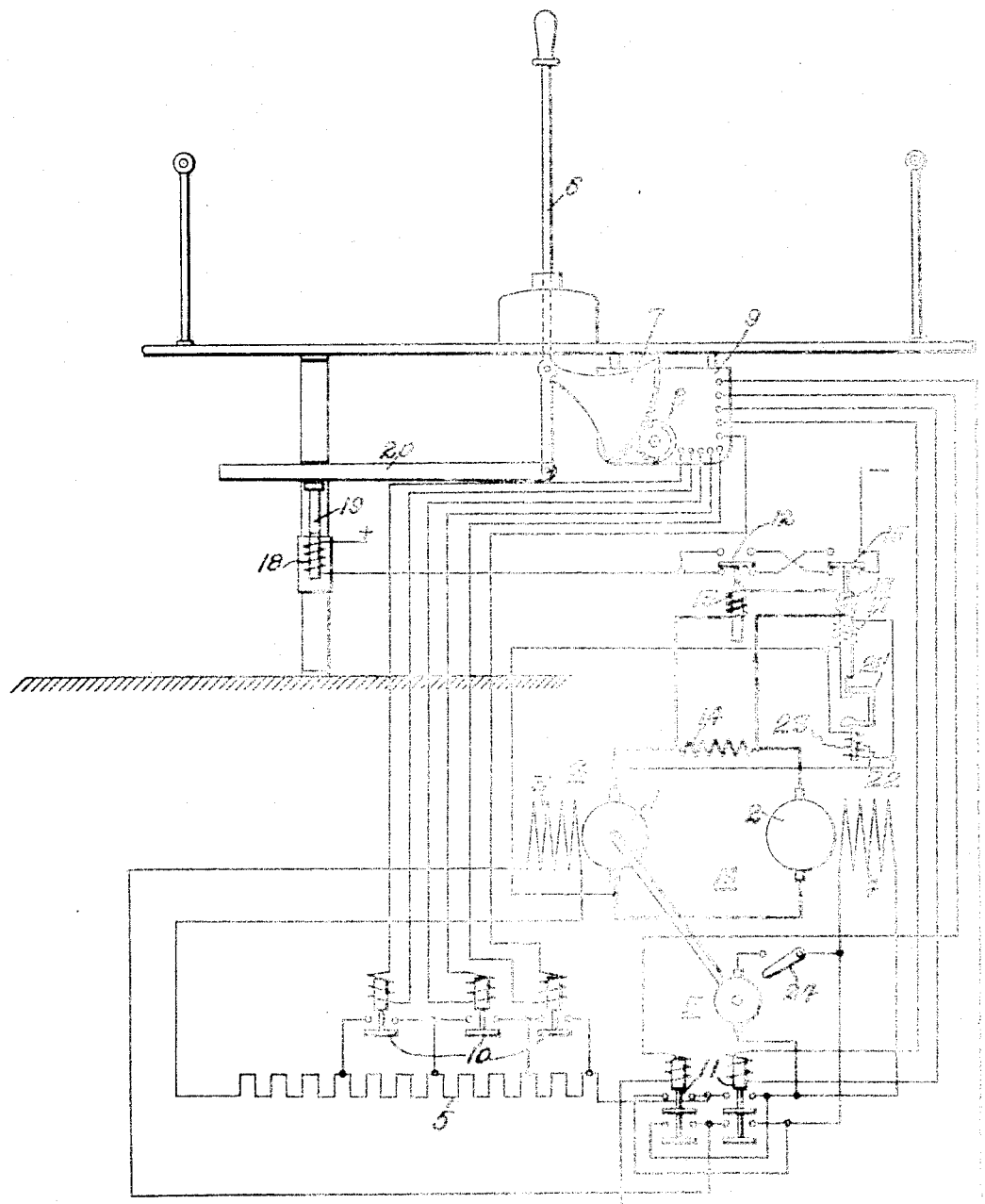
WITNESSES:
J. A. Helsel.
David Rines
INVENTOR
Henry D. Murdock
BY
ATTORNEY Patented Nov. 28, 1922.

1,437,068

UNITED STATES PATENT OFFICE.

HENRY D. MURDOCK, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

Application filed May 23, 1919. Serial No. 299,161.

*To all whom it may concern:*

Be it known that I, HENRY D. MURDOCK, a citizen of the United States, and a resident of Wilkinsburg, in the county of Allegheny and State of Pennsylvania, have invented a new and useful Improvement in Control Systems, of which the following is a specification.

My invention relates to control systems and it has particular relation to systems for effecting the acceleration and the deceleration of dynamo-electric machines.

Such machines are commonly controlled by means of resistors which are automatically governed to prevent subjecting the machines to excessive currents.

The object of my invention is to provide an improved control system of the character indicated above.

My invention finds special application to systems comprising a motor and a generator, the armatures of which are connected in a closed circuit. The speed and the direction of rotation of the motor are controlled by varying the voltage of the generator in value and in direction. The voltage of the generator is controlled by varying its field excitation by means of an exciter which is in circuit with the field-magnet windings.

In such systems, it is desirable that the motors shall be accelerated at a maximum rate in order to prevent the waste of much valuable time. To accomplish this result, it is necessary that the currents traversing the motors and the generators shall be maintained at maximum safe values throughout the entire periods of acceleration and deceleration.

If the current rises above a predetermined value during acceleration, a relay customarily operates to insert an additional portion of the resistor into circuit to reduce the field excitation of the generator and thereby to reduce the current traversing the armatures of the two machines to a safe value. During deceleration, if an excessive amount of resistance is reinserted into the generator field-winding circuit, the motor may act as a generator to cause an excessive rush of current. This danger is customarily avoided by utilizing a second relay to temporarily effect the short-circuiting of an additional portion of the resistor. Such operation is not entirely satisfactory because some means should be provided for stopping the further operation of the controller arm until the relays have had an opportunity to effect a sufficient reduction in current.

According to my invention, the above-named relays are employed, not to short-circuit additional portions of the resistor, but to operate a magnetic brake which may stop further actuation of the controller. The brake acts immediately upon the current reaching an excessive value, so that the current is not permitted to increase. The brake becomes released when the current falls to a safe value.

My invention will be made clear in connection with the accompanying drawing, in which the single figure is a diagrammatic view of circuits and apparatus embodying my invention.

The windings of armatures 1 and 2 of a generator G and a motor M are connected in series. The generator G has a field-magnet winding 3 and the motor M a field-magnet winding 4 that are separately excited by current from an exciter E. The generator G and the exciter E are customarily mounted upon the same shaft, which is driven by a large induction motor (not shown), which motor is adapted to be connected to, and disconnected from, a source of current. It will be understood, however, that the machines are not necessarily so mounted and that the circuit of the motor and the generator may be opened and closed by means of a switch (not shown) in series with the armatures 1 and 2.

A resistor 5, which is in circuit with the field-magnet winding 3, may be governed by means of a manually operable arm 6, a gear 7, a pinion 8 and a drum controller 9.

Although I have shown the controller arm 6 as pivotally mounted, it will be understood that this is for illustration merely and that the gear 7 may be a gear sector, as illustrated, or a slidably mounted gear, or it may be of any other equivalent form. The drum of the controller 9 may directly close short circuits for the resistor 5 or it may do so through the medium of contactors 10. It may control also reversing switches, which are diagrammatically indicated at 11, for reversing the direction of current flow through the field winding 3 of the generator G.

The actuating coil 13 of a relay 12 is connected across the terminals of a translating device, such as a resistor or a reactor 14 which is in series with the motor and generator armatures. A second relay 15 is provided with a similar coil 16 and with a second coil 17 which is connected across the terminals of the generator armature 1. The coils 16 and 17 are designed to oppose each other during normal operation. The relay 12 is accordingly controlled in accordance with the current traversing the main circuit, and the relay 15 in accordance with this current and the voltage of the generator.

The relays 12 and 15 control the energization of a coil 18 of a magnetic brake 19 that is designed to act upon a member 20 which is connected to the controller arm 6. The brake may be positive in its action, so as to prevent further movement of the controller arm 6. Preferably, however, it exerts simply a retarding force, so as to make it more difficult to move the controller arm 6. The coil 18 may be supplied with current from the exciter E or from any other source.

The relay 15 is provided with a member 21' which is adapted normally to lock it in its lower position. The lock 21' may be released, in opposition to the force of gravity, by means of a magnetically operable member 22 having an actuating coil 23, which is connected across the armature terminals of the generator G.

In operation, the generator and, therefore, the motor may be started by connecting the main induction motor to the line, or in any other desired way. A manually operable switch 24 may be closed to connect the field windings 3 and 4 across the terminals of the exciter E. The reversing switch 11 may be operated in accordance with the required direction of operation of the motor M. Actuation of the controller arm 6 will result in short circuiting successive portions of the resistor 5.

An increased current will thereupon traverse the field-magnet winding 3. The excitation of the generator G will thereupon be increased to a corresponding degree, and a correspondingly higher voltage will be supplied to the motor M.

If the controller arm 6 be actuated at such rate that an excessive portion of the resistor 5 is short-circuited and, therefore, an excessive current is supplied to the motor M, the coil 13 of the relay 12, which is of the well-known fluttering type, will be sufficiently energized to actuate the relay to its upper position. The circuit of the coil 18 will then be closed through the relay 12, in its upper position, and the relay 15, in its lower position. The brake 19 will thereupon be actuated into engagement with the member 20, rendering it more difficult for the operator to actuate the arm 6 to effect any further short circuiting of the resistor 5.

The current traversing the circuit of the armatures 1 and 2 will thereupon commence to decrease. When this current reaches a value sufficient to permit the relay 12 to assume its normal, lower position, the brake 19 will be released and the operator may then continue the short-circuiting operation without danger of subjecting the armatures 1 and 2 to excessive currents. The oscillation of the relay 12 will continue until the motor M has accelerated to full speed.

By means of this arrangement, the current traversing the motor circuit may be maintained at a substantially constant value throughout the period of acceleration. If desired, however, as in cases of emergency, the operator may, owing to the nature of the brake 19, actuate the controller arm 6 to effect the short-circuiting of the resistor 5 as rapidly as possible.

When it is desired to decrease the speed of the motor, the controller arm 6 may be actuated in the opposite direction to gradually insert the resistor 5 in series with the field-magnet winding 3. If the value of the voltage of the generator becomes less than that of the counter-electromotive force of the motor, the latter operates as a generator, and the current traverses the closed circuit comprising the armatures 1 and 2 in the reverse direction. If the voltage of the generator has a relatively low value, the current traversing this dynamic-braking circuit may become excessive.

Upon the reversal of the direction of flow of current in this circuit, current traverses the coil 16 in the opposite direction and its force assists that of the coil 17 in raising the relay 15. The relay 15, therefore, will be actuated to its upper position at a current value much less than that required to effect similar actuation of the relay 12. During deceleration, then, the relay 12 will remain in its lower position, so that, upon the actuation of the relay 15, the coil 18 will be energized by the circuit including the relay 12, in its lower position, and the relay 15, in its upper position. If the current traversing the closed circuit becomes excessive, therefore, the brake 19 will be actuated to warn the operator not to move the controller arm 6 further until the current traversing the closed circuit is reduced. Upon this current falling to a predetermined value, the relay 15, which is also of the fluttering type, will assume its normal, lower position, whereupon, the retarding effect of the brake 19 will be removed. The relay 15 thus oscillates during such time as the current traversing the dynamic-braking circuit exceeds a predetermined value, for which the relay 15 is adjusted.

The advantages of a system constructed in accordance with my invention are that an electric motor may be accelerated and decelerated within the shortest possible time, or within the shortest time consistent with safety, as desired. The controller arm 6 is always movable, but the brake 19 exerts a retarding influence when such movement is undesirable. Provision is thus made for preventing further short-circuiting or further reinserting into circuit of the resistor 5 as soon as the current traversing the main circuit exceeds predetermined values.

In some installations, it is found that the voltage of the coil 17 does not build up rapidly enough to prevent the relay 15 from operating simultaneously with the relay 12, under some conditions, during acceleration. By means of the locking mechanism 21', which is normally maintained in the illustrated, operative, position to maintain the relay 15 open, this effect is prevented. When, finally, the voltage of the generator builds up, the coil 23 actuates the mechanism 22 to release the lock 21', the coil 17 then being sufficiently powerful to overcome the force of the coil 16, thereby to maintain the relay 15 in its lower position.

It will be understood that my invention is not restricted to the specific embodiment herein illustrated and described, and I desire that the appended claims shall be construed broadly except in so far as limitations may be specifically imposed therein.

I claim as my invention:

1. The combination with a dynamo-electric machine adapted for a plurality of different types of operation and controlling means therefor, of means comprising relay devices for independently retarding the operation of said controlling means in accordance with the respective types of machine operation.

2. The combination with a dynamo-electric machine and controlling means therefor, of means for retarding the operation of said controlling means during the acceleration of said machine when the current traversing the latter exceeds a predetermined value and during the deceleration of said machine only when the current traversing the same exceeds a second predetermined value.

3. The combination with a dynamo-electric machine and controlling means therefor, of means comprising a pair of relays respectively controlled by current conditions and by current and voltage conditions for retarding the operation of said controlling means.

4. The combination with a dynamo-electric machine and controlling means therefor, of means for influencing the action of said controlling means, and means governed in accordance with the current traversing said machine and the voltage of said machine for controlling said influencing means, and means controlled by the voltage of said machine for delaying the operation of said governed means.

5. The combination with a pair of dynamo-electric machines adapted for two different characters of operation and having armatures connected in series and means for controlling said machines, of means for retarding the operation of said controlling means in varying degrees responsive to the respective characters of machine operation.

6. The combination with a motor and a generator having armatures connected in series and a translating device in series with said armatures, said generator having a field-magnet winding and a resistor in circuit therewith, of a controller for short-circuiting said resistor, a brake for said controller, a relay having an actuating coil in circuit with said translating device for energizing said brake during the acceleration of said motor, and a relay having coils respectively in circuit with said device and connected across said generator armature for energizing said brake during the deceleration of said motor.

7. The combination with a dynamo-electric machine and controlling means therefor, of means comprising a plurality of independent relay devices controlled in accordance with materially different electrical quantities of the machine circuit for similarly affecting the operation of said controlling means.

8. The combination with a dynamo-electric machine adapted for both acceleration and deceleration and controlling means therefor, of means respectively responsive to the accelerating and the decelerating currents for affecting in different degrees the operation of said controlling means.

9. The combination with a dynamo-electric machine adapted for both acceleration and deceleration and controlling means therefor, of means comprising a plurality of relays respectively responsive to the flow of current in opposite directions and of materially different values for restraining the operation of said controlling means.

10. The combination with a dynamo-electric machine and controlling means therefor, of means comprising a pair of relays for restraining the operation of said controlling means, each of said relays having a coil energized in accordance with machine current and one relay being further provided with a coil energized substantially in accordance with the machine voltage.

11. The combination with a dynamo-electric machine and adapted for both acceleration and deceleration and controlling means therefor, of means comprising a pair of relays for restraining the operation of said controlling means, each of said relays having a coil energized in accordance with machine current and one relay being further provided with a voltage coil acting differentially to the associated current coil during the accelerating periods of said machine.

In testimony whereof, I have hereunto subscribed my name this 16th day of May, 1919.

HENRY D. MURDOCK.